(No Model.)

J. F. STEWARD.
GRAIN CONVEYING DEVICE FOR SELF BINDING HARVESTERS.

No. 512,067. Patented Jan. 2, 1894.

Witnesses.
Arthur Johnson
A. L. Upton

Inventor.
John F. Steward

UNITED STATES PATENT OFFICE.

JOHN F. STEWARD, OF CHICAGO, ILLINOIS.

GRAIN-CONVEYING DEVICE FOR SELF-BINDING HARVESTERS.

SPECIFICATION forming part of Letters Patent No. 512,067, dated January 2, 1894.

Application filed June 20, 1892. Serial No. 437,371. (No model.)

*To all whom it may concern:*

Be it known that I, JOHN F. STEWARD, of Chicago, in the county of Cook and State of Illinois, have invented a certain new and useful Improvement in Grain-Conveying Devices for Self-Binding Harvesters, of which the following is a full description, reference being had to the accompanying drawings, in which—

Figure 1:
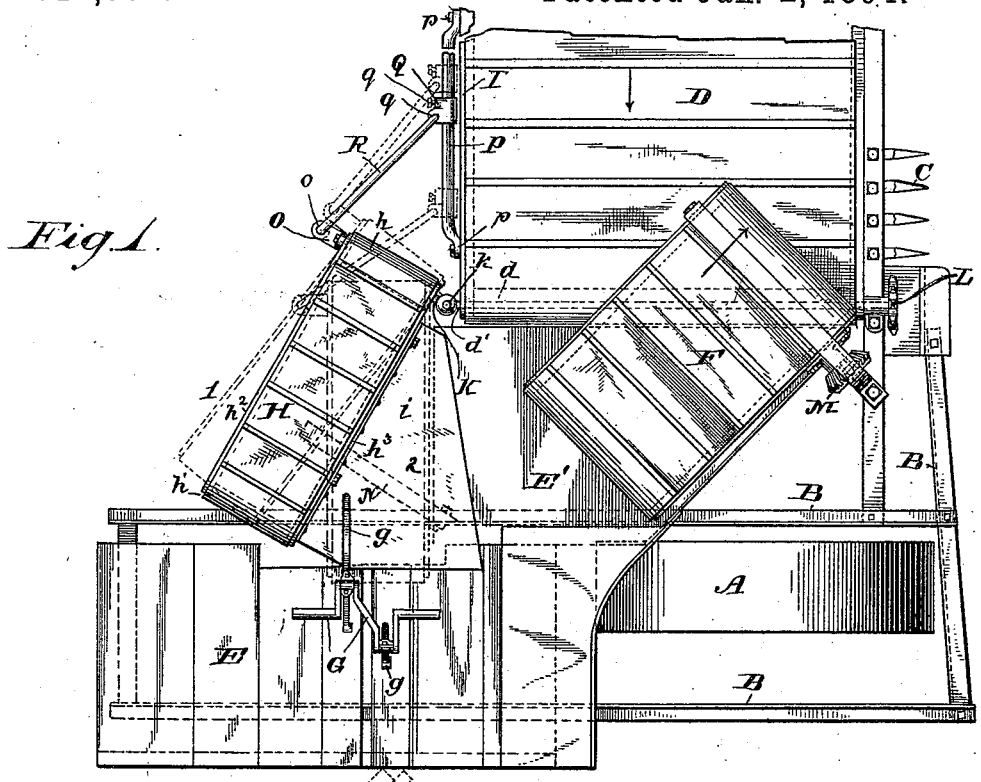
Figure 2:
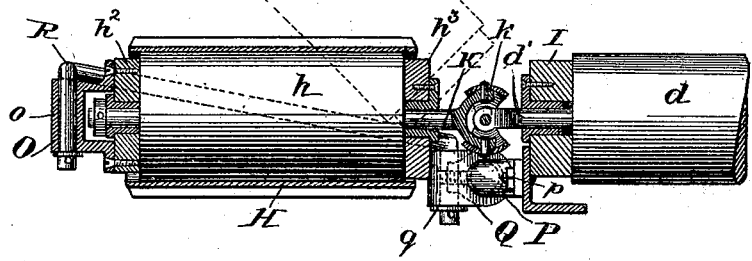
Figure 3:
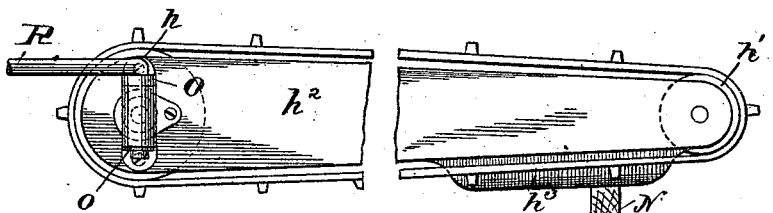

Figure 1 is a plan view of the parts forming the subject matter of my invention. Fig. 2 is a sectional view of the endless canvas delivering devices. Fig. 3 is a rear view of the supplemental head-conveying and controlling endless canvas.

The object of my invention is to convey the grain and control the movement thereof in its passage to the binding devices of a low-level self-binding harvester and deliver it in better condition than heretofore.

In the drawings, A is the main supporting wheel of a self-binding harvester; B the frame work surrounding the same and supporting the various operative parts.

The cutting apparatus is at C.

D is a platform conveying canvas of ordinary construction, located immediately behind the cutting apparatus.

E is the binder table, and E' a platform extending from the delivery end of the grain conveyer D to the binder table.

F is an endless conveyer, having its receiving end over the delivery end of the conveyer D, overtopping same and so high thereabove that the swath of grain may pass beneath it.

G is so much of a packer shaft as necessary to illustrate my invention, having the packers $g$ and $g$ above the binder table and adapted to receive the grain delivered thereon and move it onward.

I have shown no means for giving the conveying canvases rotation other than gears and sprocket wheels on the shafts of the drums which move them. In the matter of construction and position of the conveying canvas D, the overlying endless canvas F, the binder table, and the platform E', I show nothing new, but it is the combination of a supplemental conveyer, now to be considered, with these parts, that this application has to do.

H is an endless slatted canvas, lying so low that the grain delivered by the platform conveyer D may also move over it, and having the drums $h$ and $h'$, suitably journaled in the frame pieces $h^2$ and $h^3$.

$d$ is a roller at the delivery end of the conveyer D, from which the said conveyer receives its motion. It is journaled in bearings on the canvas guiding pieces, and extending through the rearward guiding piece I is the journal $d'$.

K is a shaft carrying the roller $h$. This shaft is connected to the shaft $d'$ by means of the universal coupling $k$. The roller $d$ is driven by the sprocket wheel L, and the conveyer F is driven by means of the bevel pinion M, both suitably connected to the gearing of the machine. The packer shaft may be connected to the driving gearing at the front or rear of the machine in any of the well known ways. As the driving shaft of the supplemental conveyer H is connected with the shaft of the roller $d$ by means of a universal joint, the said supplemental conveyer is not only driven, but its position may be changed at will without disturbing the movement of the canvas.

In Fig. 3 it will be seen that a part of the side piece $h^3$ of the supporting frame for the canvas H is extended downward so as to rest upon a sill, N, of the main frame-work. This is merely for the purpose of preventing the conveyer from falling out of position. At the rear grainward corner of the frame of the supplemental canvas H is the arm O, and to the rear of the main platform frame is the rod P, secured at $p$—$p$ by bolting. Upon the rod is the slide Q, and in a sleeve-like eye $q$ of Q and a similar sleeve-like eye $o$ in the arm O is thrust the ends of a doubly hooked connection R. The hooks of the connection work freely in the holes $o$ and $q$. I desire to move the supplemental canvas H to various positions at its delivery end, and also to change the angle of its plane relative to the horizon. The action of the connections just described will be readily understood by reference to the figures. If the set screw $q'$ be loosened, the slide Q may be slid to either of the positions shown in dotted lines in Fig. 1, in which case the supplemental conveyer will be swung to one of the positions shown in dotted lines. With the set screw turned so as to clamp the slide to the bar P, the parts will be held in adjustment. If it is desired to throw the rear edge of the supplemental canvas high as shown in Fig. 2, the set screw $q'$ may be loosened and the slide Q rocked on the guide P. The connection R is made stiff and, being connected to the slide Q and to the arm O upon the supplemental conveyer, the said conveyer will be held in any position to which, through the connection, slide, and set screw, it is adjusted. In many conditions of grain the straws are thrown backward by the reel and wind, and it is often necessary to guide them so that they may be brought to the position where the bundle is formed. In using platform binders this is equally true, but no successful means has been employed, to my knowledge, for handling that condition, or operating upon the head portion of straws generally. If short grain is being cut and bound the supplemental conveyer H may be shifted to position 2 of Fig. 1. The tendency will then be to carry the scattering portions directly toward the packers. If the grain be a little longer the conveyer H may be in position shown in full lines in Fig. 1, and in order to give the scattering straws an opportunity to slide forward while being moved deliveryward, the supplemental conveyer H may be tipped into the position shown in dotted lines in Fig. 2. In very long grain where the heads of the straws need support, the supplemental conveyer may be prostrated and moved backward, as shown in position 1, by dotted lines in Fig. 1. By means of the adjusting devices it is thus seen that this conveyer may be placed in any desired position, whatever the condition of the grain.

$i$ is a sheet of metal hinged to the lower part of the piece $h^3$ and adapted to lie upon the binder table so as to cover the space that would otherwise exist between the front side of the supplemental conveyer H and the part E' of the table.

I am aware that supplemental canvasses have been adapted to operate upon heads of grain in machines that elevate the latter before binding, but am not aware that they have been adapted to partly underlie, and thus support the heads of the grain, nor slanted to permit the supported grain to slide forward so as to be delivered well into the bundle that is being formed.

What I claim as my invention, and desire to secure by Letters Patent, is—

1. The combination of the conveyer D adapted to move the grain stubbleward to the overhanging conveyer F, the latter adapted to receive the said swath of grain and operate upon the butts thereof and move them onward and at the same time push them rearward, and the supplemental conveyer H adapted to underlie the grain and advance the heads thereof, substantially as described.

2. In combination with the conveying devices of a self-binding harvester, the supplemental underlying head conveyer H, adjustable so as to underlie the heads of the grain whether the latter be long or short, and carry them onward, substantially as described.

3. In combination with the conveying devices of a self-binding harvester, the supplemental underlying conveyer H, adjustable so as to throw its rear edge higher than the forward edge to any desired position, substantially as described.

4. In combination with the conveying devices of a self-binding harvester, the supplemental conveyer H, adjustable so as to change the direction of movement of the heads of the grain upon which it operates to any desired position, and also adjustable so that the plane of its surface may have any desired slant to permit the grain to slide forward therefrom while being moved deliveryward, substantially as described.

5. The combination of the frame of the supplemental canvas H, pivoted at its receiving end and free to be swung at its delivery end, the guide P, the slide Q, and connection R, the said slide adapted to be set in any desired position, substantially as described.

JOHN F. STEWARD.

Witnesses:
E. A. ELDRED,
A. L. UPTON.